US006057545A

United States Patent [19]

Sugiyama

[11] Patent Number: 6,057,545

[45] Date of Patent: May 2, 2000

[54] TIME-TO-FLIGHT MASS SPECTROMETERS AND CONVERGENT LENSES FOR ION BEAMS

[75] Inventor: Naoki Sugiyama, Tokyo, Japan

[73] Assignee: Hewlett-Packard Company, Palo Alto, Calif.

[21] Appl. No.: 08/998,234

[22] Filed: Dec. 26, 1997

[30] Foreign Application Priority Data

Dec. 26, 1996 [JP] Japan .................................... 8-347779

[51] Int. Cl.$^7$ ............................ B01D 59/44; H01J 49/00

[52] U.S. Cl. ............................................ 250/287; 250/281

[58] Field of Search .................................... 250/287, 288, 250/281

[56] References Cited

U.S. PATENT DOCUMENTS

| | | | |
|---|---|---|---|
| 5,343,624 | 9/1994 | Symons . | |
| 5,420,423 | 5/1995 | Linden | 250/281 |
| 5,481,107 | 1/1996 | Takada et al. | 250/281 |
| 5,637,869 | 6/1997 | Bergmann | 250/287 |
| 5,654,543 | 8/1997 | Li | 250/287 |
| 5,663,560 | 9/1997 | Sakairi et al. | 250/281 |
| 5,825,025 | 10/1998 | Kerley | 250/287 |

OTHER PUBLICATIONS

"An Inductively Coupled Plasma–Time–of–Flight Mass Spectrometer for Elemental Analysis" D.P. Myers, G. Li, P.P. Mahoney, and G.M. Hieftje J.Am.Soc Mass Spectorom, 1995, vol. 6, pp. 400–410.

"Preliminary Design Considerations and Characteristics of an Inductively Coupled Plasma–Time–of–Flight Mass Spectrometer" D.P. Myers and G.M. Hieftje Microchemical Journal, 1993, vol. 48, pp. 259–277.

"252 Cf Plasma Desorption Mass Spectrometry Using a Mamyrin Reflection in a Low Voltage Regime" Paul W. Geno and R.D. Macfarlene International Journal of Mass Spectrometry and Ion Processes, 1987, vol. 77, pp. 75–94.

"Laser Assisted Reflection Time–of–Flight Mass Spectrometry", B.A. Mamyrin International Journal of Mass Spectrometry and Ion Processes, 1994, vol. 131, pp. 1–19.

English abstract of Japanese patent publication No. 08–007831.

*Primary Examiner*—Edward P. Westin
*Assistant Examiner*—Nikita Wells

[57] ABSTRACT

The present invention relates to time-of-flight mass spectrometers that use a pulser to provide an orthogonal acceleration to a continuous flow of a beam of ions so as to cause a packet of ions to flow out into an orthogonal direction and enter a detector. The invention makes the size of the emission outflow aperture of a pulser in the direction of the continuous flow of ions greater than the size of the aperture of the ion detector in the direction of the continuous flow of ions. In particular, the size of the ion emission aperture is at least twice as large as the size of the aperture of the detector.

13 Claims, 8 Drawing Sheets

TIME-TO-FLIGHT MASS SPECTROMETERS AND CONVERGENT LENSES FOR ION BEAMS

FIELD OF THE INVENTION

The present invention relates to time-of-flight mass spectrometers and convergent lenses for ion beams, and, in particular, it applies to time-of-flight mass spectrometers that use a pulser to provide an orthogonal acceleration to a continuous flow of a beam of ions so as to cause ions in the form of packets to flow in an orthogonal direction and enter a detector. The present invention further relates to time-of-flight mass spectrometers that have improved mass resolution (mass descrimination), related to sensitivity to the ion mass and variation in the optimum tuning point, and improved stability (robustness) with regard to environmental changes such as changes in the characteristics of the ion source due to reasons such as changes in the condition of the plasma. The present invention presents convergent lenses for ion beams that are of simple design, and also have a high operating voltage so that they do not exhibit errors in operation that arise at low operating voltages, such as are caused by electric fields that occur from accumulated charge on metal plates that form the mirrors or lenses. Such accumulation of charges occurs when the lenses smears by a sample to be introduced and forms a thin insulating layer thereon at which thereby causing charges to build up and generate electric fields.

BACKGROUND OF THE INVENTION

There are examples (for instance, Japanese patent laid-open publication numbers: 7(1995)-6730; 8(1996)-7831; 8(1996)-31370; and 8(1996)-31372 of time-of-flight mass spectrometers that make use of the fact that a continuous flow of ions in the form of a beam (a "continuous ion beam") can be spatially separated along a flight path due to the differences in the speeds of the ions, and each ion then enters a detector at different time so that the ions to be analyzed can be separated.

FIG. 1, shows an example of such a time-of-flight mass spectrometer which contains an ion source 10 and uses a plasma to ionize a test material, a sampling cone 12 that samples atoms that have been ionized by ion source 10, a skimmer cone 14 that converts a portion of the ions that pass through sampling cone 12 into a thin ion beam, an ion lens 18 that converges the ions that pass through skimmer cone 14 and forms them into a continuous ion beam 16, a pulser 20 that provides an orthogonal acceleration to continuous ion beam 16 to cause a packet of ions 24 to flow out in an orthogonal direction, a flight tube 26 that captures ions 24 from ion output aperture 22, a deflector 28 that changes the flight direction of ions 24 that fly along flight tube 26, and a detector 30 that detects ions 24 that flow through flight tube 26.

According to FIG. 1, a sample that was ionized by ion source 10 is formed into a narrow beam by sampling cone 12 and skimmer cone 14, and thereafter is transmitted and focused into pulser 20 by ion lens 18. In the following explanation, the direction of flow of the continuous ion beam is called the "x" direction, the long direction of flight tube 26 that is orthogonal to the "x" direction is called the "y" direction, and the direction of the width of pulser 20, orthogonal to both the "x" and "y" directions, is called the "z" direction.

Pulser 20 is composed, for example, of two electrode plates 20*a*, 20*b*. One of the electrode plates (20*b* in the FIG.) contains an ion output aperture 22, so that ions 24 flow into flight tube 26. Ion output aperture 22 is covered with a metal mesh 22 so that the electrical field of flight tube 26 has no effect on the inside of pulser 20.

Ion beam 16 that flows within pulser 20 is a continuous beam, but, as shown in FIG. 2, when an instantaneous high voltage is applied to one of electrode plates 20, ions 24 are directed from ion output aperture 22 into flight tube 26. Because such applying time is extremely short, only the ions that are in the vicinity of ion output aperture 22 of pulser 20 are instantaneously flown out. Ions 24 that flow out in the form of packets travel along the length L of flight tube 26 and reach detector 30. As a result, the detection signal shown in the bottom portion of FIG. 2 is obtained. The flight time of an ion tm can be defined as follows in which the velocity of an ion 24 in a longitudinal direction (y direction) of flight tube 26 is $v_y$.

$$tm=L/v_y \quad (1)$$

$$vy=(2eV_f/m)^{1/2} \quad (2)$$

Wherein e is the ion charge, $V_f$ is a the voltage to be applied to flight tube 26 that is used to accelerate a packet of ions 24, and m is an ion mass. Apparent from equation 2, $V_y$ depends on the ion mass m, and therefore the difference in the time of flight tm can be used to perform a mass separation.

At the same time, we also have the following equation for the velocity $V_x$ of the ion in the x direction, which is orthogonal to the y direction (the x direction is the direction of continuous ion flow). Velocity $V_x$ is independent from the flight time tm but is related instead to the location at which ions are reached at detector 30.

$$V_x=(2eV_p/m)^{1/2} \quad (3)$$

Wherein $V_p$ is a plasma potential of continuous ion beam 16.

Velocity $V_x$ in the x direction depends on the condition of the plasma in ion source 10 and on the ion mass m, so a voltage $V_d$ is applied to deflector 28 in order to make the ions reach at the center of detector 30.

In conventional time-of-flight mass spectrometers with this construction, ion emission aperture 22 in electrode plate 20*b* of pulser 20 was a small hole, of about the same diameter D as the size of the aperture in detector 30 (as shown in FIG. 3), in order to create an electric field having a minimum turbulence within the pulser and thereby increase the resolution.

In a time-of-flight mass spectrometer as shown in FIG. 1, it is necessary to have a parallel beam that is narrow in the y direction within pulser 20 in order to obtain high resolution. In other words, in the y direction, which is a flight direction within the flight tube 26, high resolution requires a small dispersion, while in the direction of the continuous ion flow (x direction), as well as in the direction (z direction) of the width of pulser 20, which is orthogonal to the x direction, even if there is dispersion it has no effect on the resolution.

Therefore, in the past, as shown in FIG. 4, the final stage of ion lens 18 comprises a quadrupole lens 19 having four electrode poles 19*a* to generate a parallel beam that is wide in the z direction and narrow in the y direction.

PROBLEMS THAT THE PRESENT INVENTION ATTEMPTS TO SOLVE

Each ion has a different kinetic energy based on its mass, and therefore the angles θ at which the ions flow out are also different. The deflector causes the ions of the desired mass to enter detector 30, and even if the efficiency of the entry into the detector—that is, its sensitivity—is high, there still remains a mass dependency in the sensitivity and the optimum tuning point. Also, even when the same mass is being measured, changes in the characteristics of the ion source, such as due to changes in the condition of the plasma, may result in changes in the velocity $V_x$ in the x direction, and in the angle θ, which would cause the sensitivity unstable. Furthermore, the use of deflector 28 improves the sensitivity for the desired mass, but also causes problems such as deteriorating the resolution.

When making the ion beam narrow in the y direction, it is often leads a dispersion in the z direction, creating a problem for this type of time-of-flight mass spectrometer. To prevent such dispersion of a packet of ions 24 in the z direction,.which travels along flight tube 26 and thereby increase its sensitivity, it is possible to consider placing a circular aperture, called an Einzel lens 32, within flight tube 26. However, as shown by a broken line in FIG. 1, this causes a problem an ion beam may be deflected by a different incident angle of lens 32 and a lens voltage.

Also, as shown in FIG. 4, if a quadrupole lens 19 is used as the final stage of ion lens 18, the quadrupole lens generates an electric field in the direction of a convergence of ion beam. Accordingly, when the lens having a relatively low potential is utilized, it causes a lower operation voltage and the generated electric field to become unstable due to a degree of varying convergence by a charge-up.

The object of the present invention is to eliminate these prior art problems by improving mass dependency of time-of-flight mass spectrometers, as well as a robustness in connection with changes in the characteristics of the ion source such as due to changes in the condition of the plasma.

Another object of the present invention is to prevent a deterioration of a sensitivity by preventing a dispersion of a packet of ions in a direction that is orthogonal to the direction of a continuous ion flow and the direction of the ion packet which travels in a flight tube.

Yet another object of the present invention is to provide convergent lenses for an ion beam with high stability and a high operating voltage.

SUMMARY OF THE INVENTION

The present invention addresses its first object (with regard to time-of-flight mass spectrometers that use a pulser to provide an orthogonal acceleration to a continuous flow of a beam of ions so as to cause a packet of ions to flow out in an orthogonal direction and enter a detector), by providing an ion emission aperture of a pulser in which its dimension in the direction of the continuous flow of ions sufficiently greater than the dimension of an aperture of an ion detector in the direction of a continuous flow of ions. In particular, the size of the ion emission aperture is at least twice as large as the size of an aperture of a detector.

Next, the present invention addresses its second object by providing (within the flight tube along which flow a packet of ions emitted from the ion emission aperture of the pulser), an ion lens with an aperture that is long in the direction of the above-mentioned continuous flow of ions and short in the direction orthogonal to both the direction of the continuous flow of ions and the direction of ion packet flow.

Finally, the present invention addresses its third object with convergent lenses for ion beams, which includes a tabular inner electrode with at least one pair of apertures on its side surface and one or more tabular outer electrodes that cover the apertures of said inner electrode. Multiple pairs of apertures on the side surface of the inner electrode are provided along an axial direction of the inner electrode by varying its circumferential angle to the aperture positions, and the outer electrodes are provided at each side surface aperture of inner electrodes in an axial direction so that its convergence can be varied in different direction.

Such outer electrode can be divided into a number of pieces along its circumferential direction in order to deflect the ion beam.

Furthermore, by using an inductive coupling plasma as an ion source to generate a continuous ion flow, an ionization efficiency for elements can be enhanced.

EXPLANATION OF NOTATIONS

10: Ion Source
16: Ion Beam
18: Ion Lens Collection
20: Pulser
20*a*, 20*b*: Electrode Plates
22: Ion Emision Aperture
24: Ions
26: Flight Tube
30: Detector
34: Ion Lens
34*a*: Aperture
40: Convergent Lens For Ion Beams
42: Inner Electrode
43, 43*a*, 43*b*: Side Apertures
44, 44*a*, 44*b*, 44*c*, 44*d*: Outer Electrodes.

Detailed Description of the Invention

Figure 1:
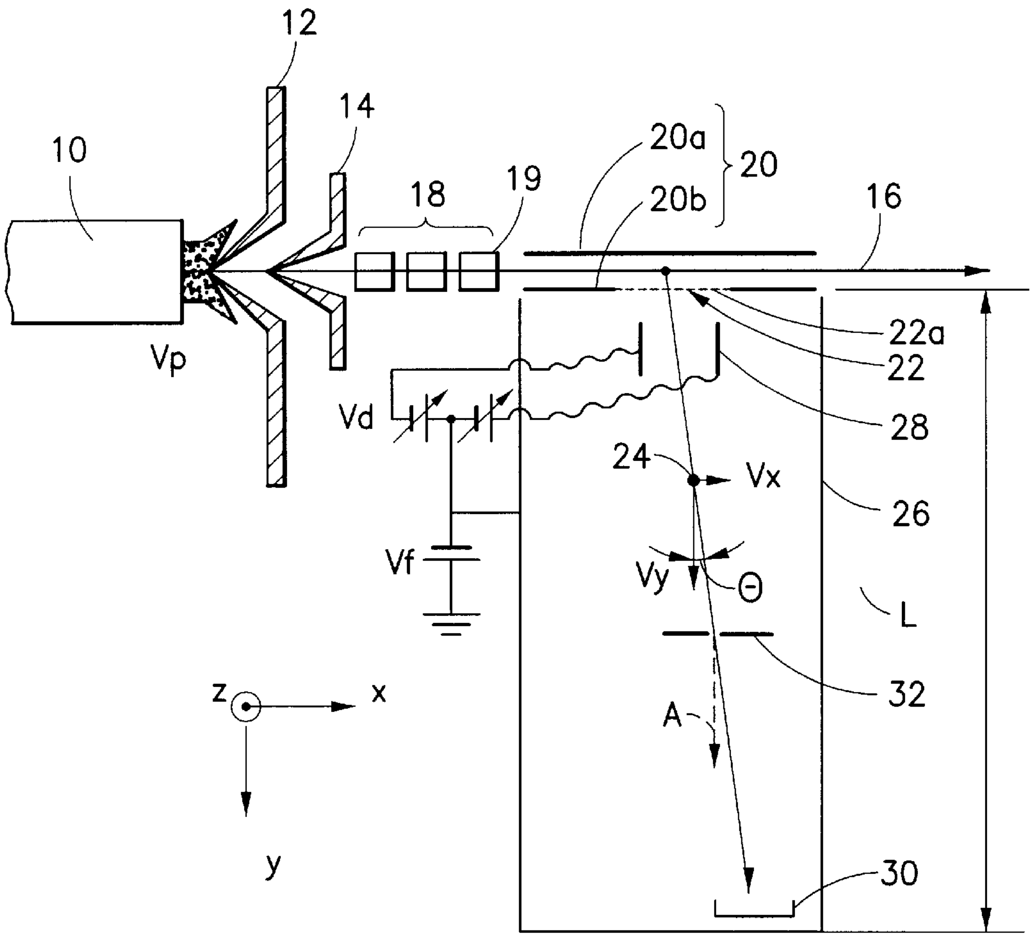
FIG. 1 is a cross-sectional view showing complete construction of a time-of-flight mass spectrometer.
Figure 2:
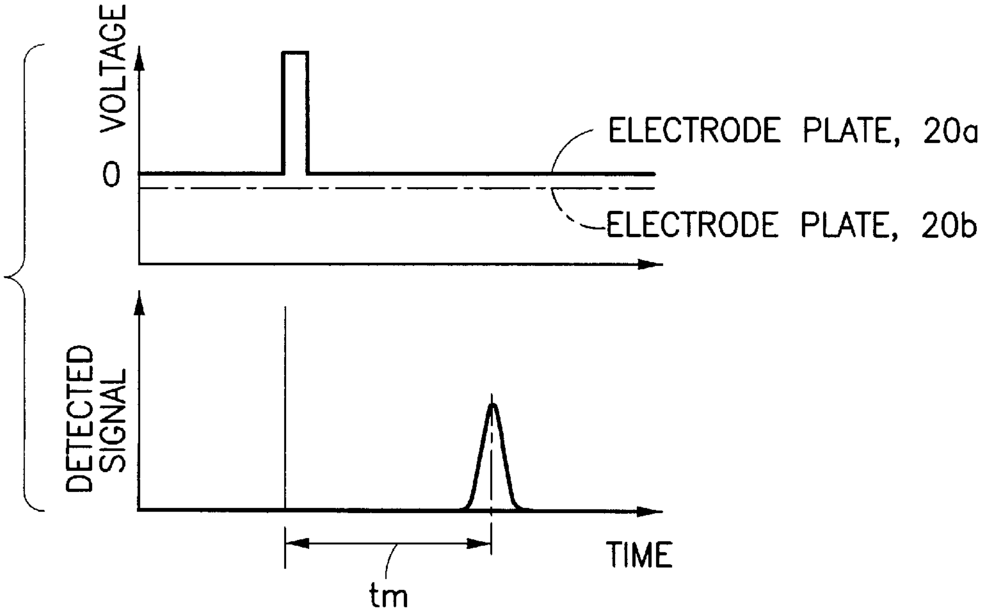
FIG. 2 is a graph that shows an example of the relationship between a voltage that is applied to the pulser of the time-of-flight mass spectrometer of FIG. 1 and the detection signal that is detected at the detector.
Figure 5:
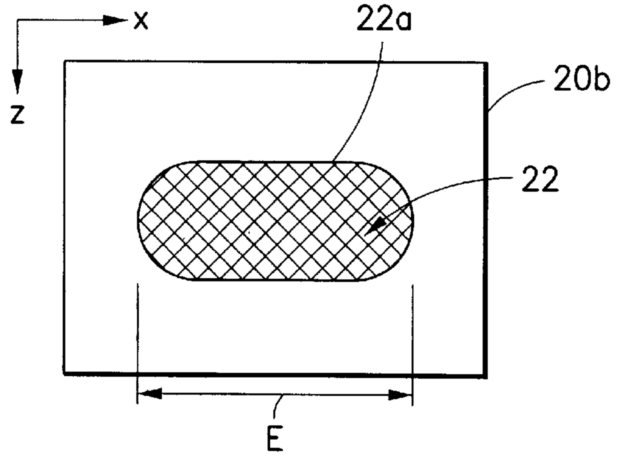
FIG. 5 shows the ion output aperture of a pulser that is used in the present invention.

The present invention modifies the time-of-flight mass spectrometer of FIG. 1 by making the size E of ion emision aperture 22 in electrode plate 20*b* of the pulser 20 in the direction of continuous ion flow (x direction), at least twice as large as the size D of an aperture of detector 30 which detects ions 24 in the direction of the continuous ion flow (x direction)(see FIG. 5).

Figure 3:
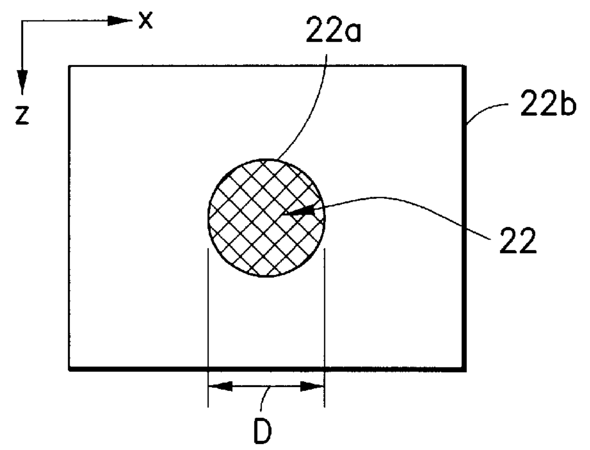
FIG.3 PRIOR ART
FIG. 3 shows the ion emission aperture of a prior art pulser that is used in the time-of-flight mass spectrometer of FIG. 1.
Figure 4:
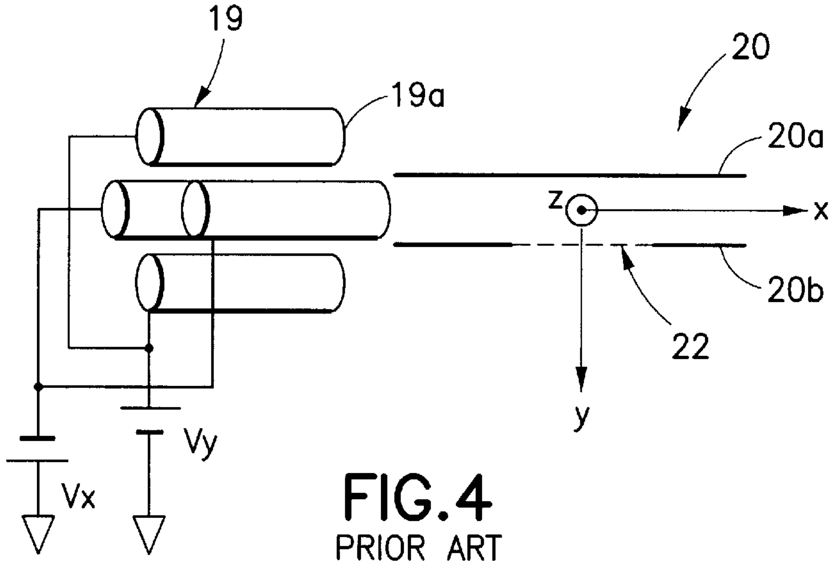
FIG.4 PRIOR ART
FIG. 4 is a perspective diagram that shows a quadrupole lens that is used as the final stage of a prior art ion lens.

As shown in FIG. 3, conventionally the size of ion emission aperture 22 of pulser 20 was made as small as possible, so that ions 24 that were emitted from a single point B (in FIG. 6) would enter detector 30. Further, for a difference in the velocity $v_1$ in x direction by an ion mass, a voltage was applied to the deflector 28 to change a deflection direction of ions 24.

Figure 7:
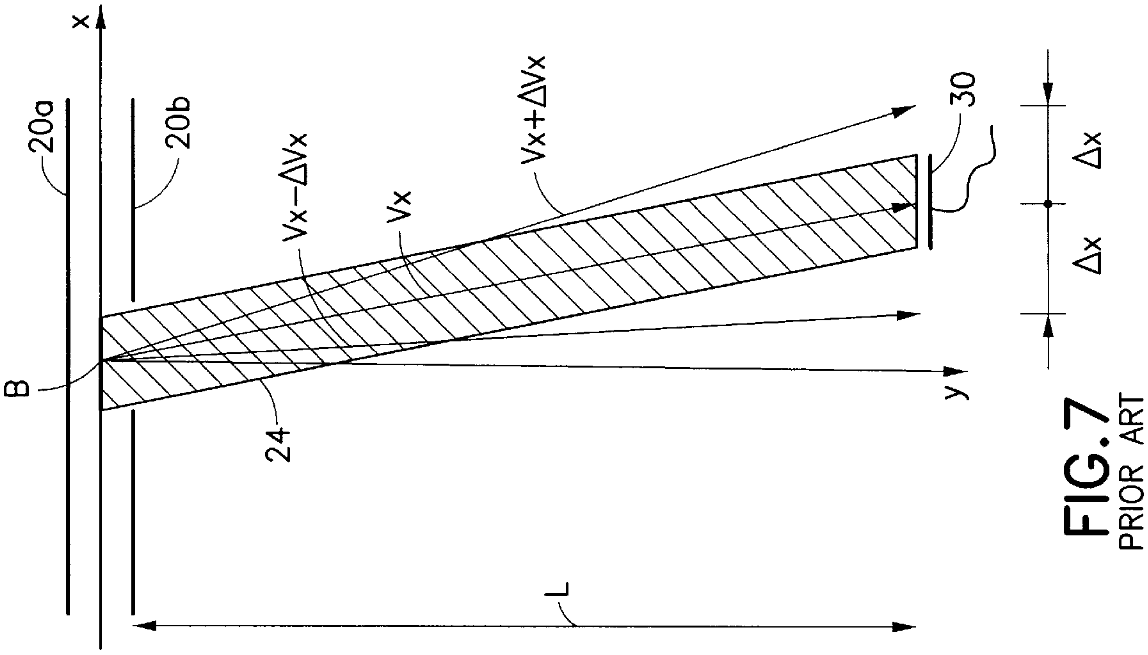
FIG.7 PRIOR ART
FIG. 7 is a cross-sectional view that explains the operation of prior art.

FIG. 7 illustrates how a packet of ions 24 enter detector 30, in an example of the prior art. The ion beam packet travels with a certain size in both x and z directions, however a thickness in y direction only affects the resolution. This thickness is basically independent of the size of the aperture in x direction. The size E of the aperture can be determined by $V_x$, a width of dispersion of $V_x$, $V_y$, flight distance L, and the size D of an aperture of the detector. For example, if two ions with the same $V_y$ flow out of the center B of pulser 20, and their velocities in x direction are $V_{x1}$ and $V_{x2}$, respectively. And the angle θ forms between a flight distance and y axis would be different for these two ions so that apparently the reaching points along the x axis at detector 30 would be different. If $V_{x1}$ and $V_{x2}$ are very different and one of the ions enters the detector, the other ion may not enter the detector. For ion sources such as ICP, it is common that $V_x$ depends on a mass number, so this type of loss of sensitivity becomes a problem. In this description, the unit used for velocity is a kinetic energy V rather than m/s.

Figure 8:
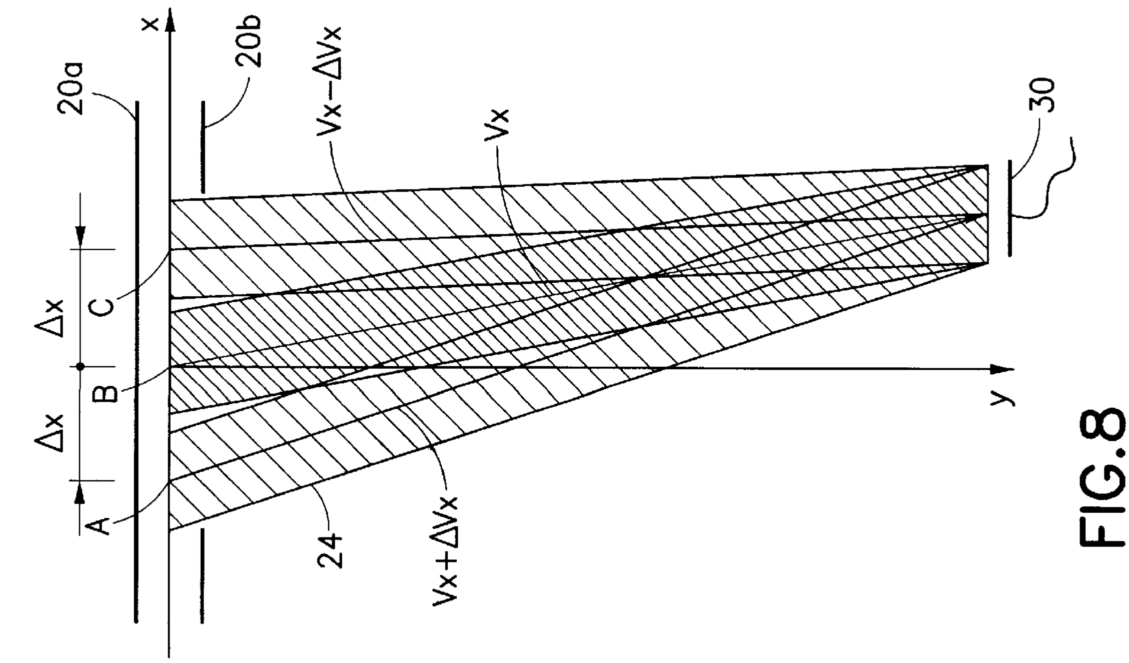
FIG. 8 is a cross-sectional view that explains the operation of the present invention.

For the present invention, for example, instead of having a deflector change the direction of the ion beam so that for some specific range of masses of ions can only reach the detector 30, the size E of ion emission aperture 22 of pulser 20 in the direction of the continuous ion flow (x direction) is increased, so that the differences in velocities $V_x$ in x direction are absorbed by the width in x direction. For example, when the ions from point B in FIG. 6 enter detector 30 and changes in the characteristics of ion source 10 decrease the velocity $V_x$ in x direction, ions 24 emitted from point B would no longer enter detector 30. In the present invention, ion emission aperture 22 is much larger, so that the ions emitted from point C can enter detector 30, and therefore the sensitivity can be maintained. As for the mass dependency caused by the fact that velocity $V_x$ in x direction varies for ions of different masses, in the present invention, the ionization efficiency of incident ions at detector 30 is unchanged, so the mass dependency can be greatly improved. FIG. 8 illustrates how a packet of ions 24 enter detector 30 in the present invention.

Next, in the case of prior art when the size E of the aperture of the pulser 20 is approximately equal to the size D of the aperture as shown in FIG. 7, a difference of $\Delta V_x$ in the velocity $V_x$ in x direction causes a displacement of Δx in the incident position on the x axis, given by the following equation, and this is a source of loss of sensitivity.

$$\Delta x=(L/2)\cdot\Delta V_x\cdot 1/(V_x\cdot V_y)^{1/2} \tag{4}$$

This is because:

$$x=L\cdot(V_x\cdot V_y)^{1/2} \tag{5}$$

Therefore, $$(dx/dv_x)=(L/2)\cdot 1/(V_x\cdot V_y)^{1/2} \tag{6}$$

On the other hand, in the present invention, when size E of the aperture of pulser 20 is larger than size D of the aperture of detector 30, as shown in FIG. 8, with regard to each of $\Delta V_x$ $(V_x+\Delta V_x)$, $V_x$, $(V_x-\Delta V_x)$ and a displacement of Δx in the point of departure, a packet of ions 24 can completely enter detector 30. For this to happen, the following equations are obtained from FIG. 8.

$$E>2\Delta x+2(D/2)=L\cdot\Delta v_x\cdot 1/(v_x\cdot v_y)^{1/2}+D \tag{7}$$

Here, if we substitute as typical values L=1000 mm, $\Delta V_x$=2V (volts), $V_x$=8V, $V_y$=500V, and D=20 mm, we obtain E=2.5 D.

Therefore, it is desirable for the size E of the aperture in pulser 20 to be at least twice as large as the size D of the aperture of detector 30. For a smaller value of L or a larger value of $V_y$, the size of the required E would be smaller. However, in such case the flight time would become shorter so that resolution, which can be given by R=T/ΔT (T: flight time, ΔT: signal pulse width) would be deteriorated. This would not be appropriate for most applications. (For the values given above, the reported resolution is between about 1000 to 2000.) Also, the size of 20 mm for the aperture of detector 30 is the largest for what is currently on the market. $\Delta V_x$=2V is a typical value for ICP ion sources. $V_x$ is a voltage difference required for introducing the ion beam into a mass spectrometer. This value can not be increased since it would directly affect an utilization rate of the ion beam. Thus a normal value is used.

Since the flight direction generally changes based on the ion mass, in order to cause the ions of the desired mass number to come to the center of detector 30, it is necessary to use a deflector 28 to adjust the flight direction. But in the present invention, this has been improved so that ions can be led to the center of the detector regardless of their mass, and therefore it is no longer necessary to have a deflector 28. Accordingly, a deterioration of resolution caused by deflector 28 can be eliminated. It is still possible to use a deflector 28 when one desires to increase the sensitivity, even if the resolution suffers.

Figure 6:
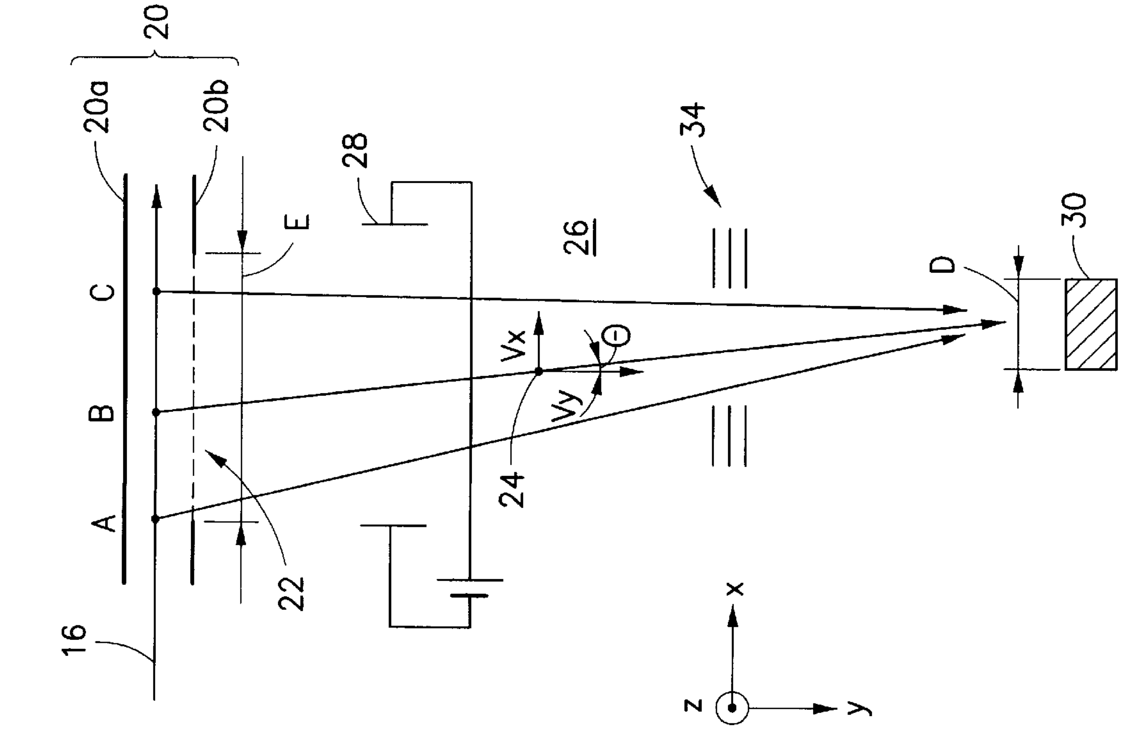
FIG. 6 is a cross-sectional view that illustrates an embodiment of the present invention.
Figure 9:
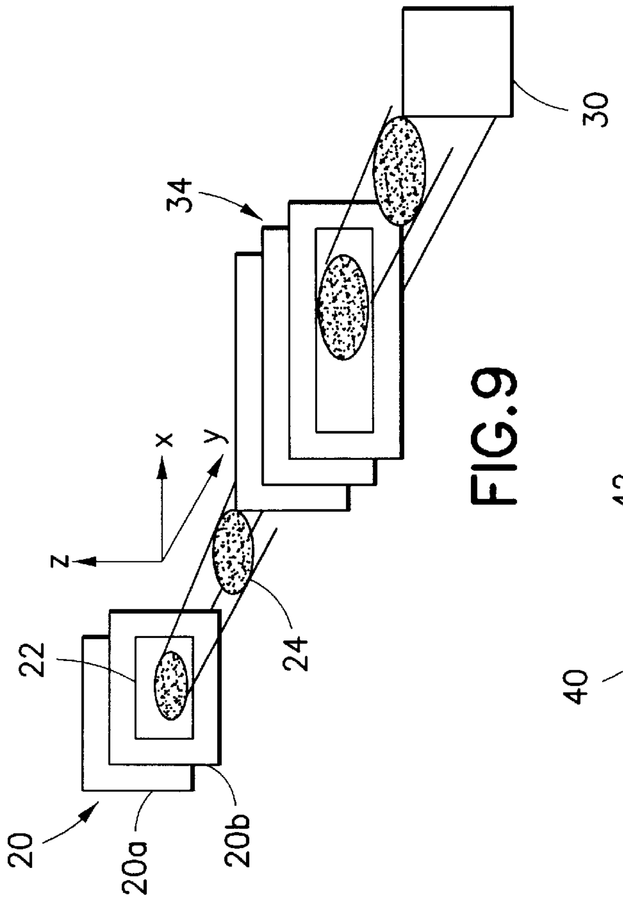
FIG. 9 is a perspective view seen from below that shows the relationships among ions that are in the form of packets, a pulser, ion lens, and a detector in an embodiment of the invention.

In another embodiment of the present invention, as shown in FIG. 9, an ion lens 34 can be placed within flight tube 26 (as shown in FIG. 6). Lens 34 includes one or more (in this example, three) ion plates 34*b* and each of which has an aperture 34*a* that is long in the direction of the continuous ion flow (x direction) and short in the z direction (perpendicular to the plane of the paper). The z direction is orthogonal to both the x direction and the emitting direction of a packet of ions 24 (y direction).

Ion lens 34 only converges in z direction, and with such converging function, the sensitivity for a dispersing beam of ions 24 can be enhanced. Generally, this dispersion in z direction is a problem for time-of-flight mass spectrometers. Such effect of this invention thus becomes important. Conventional Einzel lenses with a circular aperture cause a refraction in the ion beam (as already explained), and in addition, it can not be used for pulsers 20 with a large aperture, as shown in FIG. 5.

It is also possible to omit ion lens 34 and instead use a known pulser without a large aperture.

Figure 10:
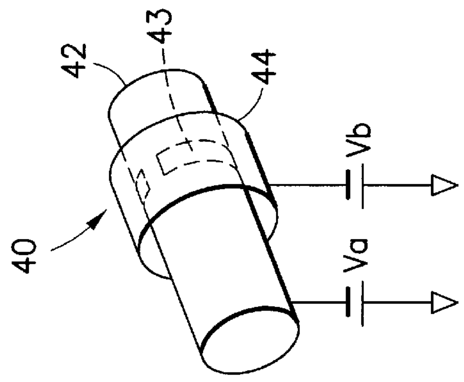
FIG. 10 is a perspective view that shows the construction of example 1 of a convergent lens for ion beams as used in an embodiment of the invention.
Figure 11:
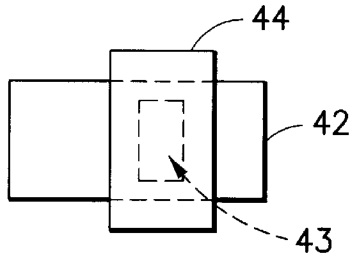
FIG. 11 is a side view of the same.
Figure 12:
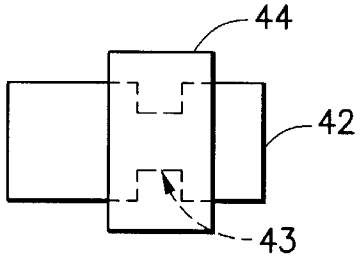
FIG. 12 is a top view of the same.

In the embodiment of the present invention, the convergent lens 40 of one example can be used for the final stage of the ion lens 18 in place of a quadrapole lens. Convergent lens 40 is illustrated in FIG. 10 (perspective view), FIG. 11 (top view), and FIG. 12 (side view). Convergent lens 40 comprises a cylindrical inner electrode 42 having a pair of apertures 43 on its side surface, and a cylindrical outer electrode 44 which covers said side apertures 43 of inner electrode 42.

By making voltage $V_a$ to be applied to inner electrode 42 of convergent lens 40 smaller than voltage $V_b$ to be applied to outer electrode 44, a width along x direction of the ion beam which is emitted from the convergent lens 40 can be narrower and its width along x direction can be wider. On the other hand, by making voltage $V_a$ to be applied to inner electrode 42 larger than voltage $V_b$ to be applied to outer electrode 44, the width along z direction of the ion beam can be narrow while wider along x direction.

Figure 13:
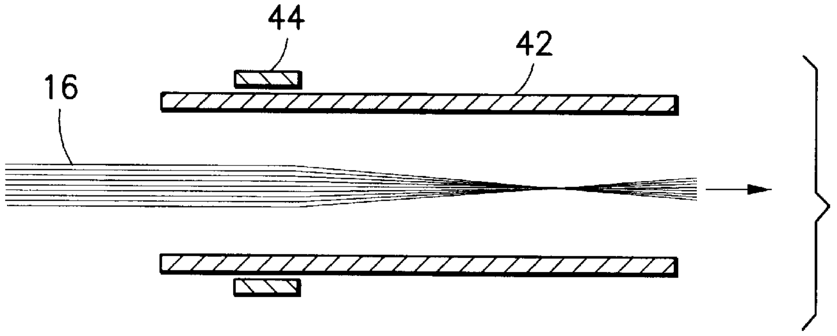
FIG. 13 is a side view that shows the shape of the ion beam in the first example of the convergent lens of FIG. 10.
Figure 14:
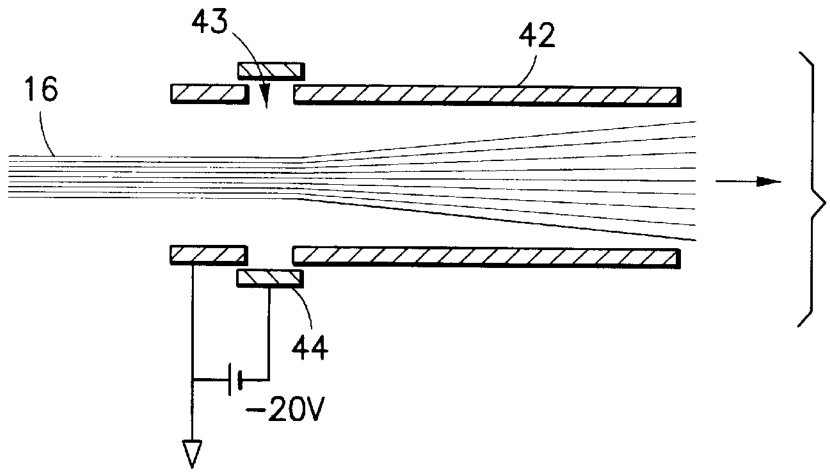
FIG. 14 is a top view of the same.
Figure 15:
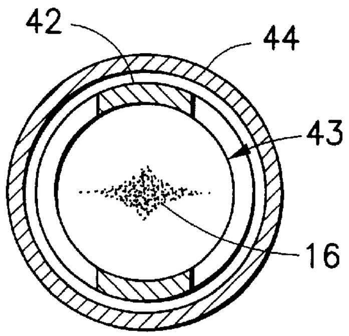
FIG. 15 is a cross-sectional view of the same.
Figure 16:
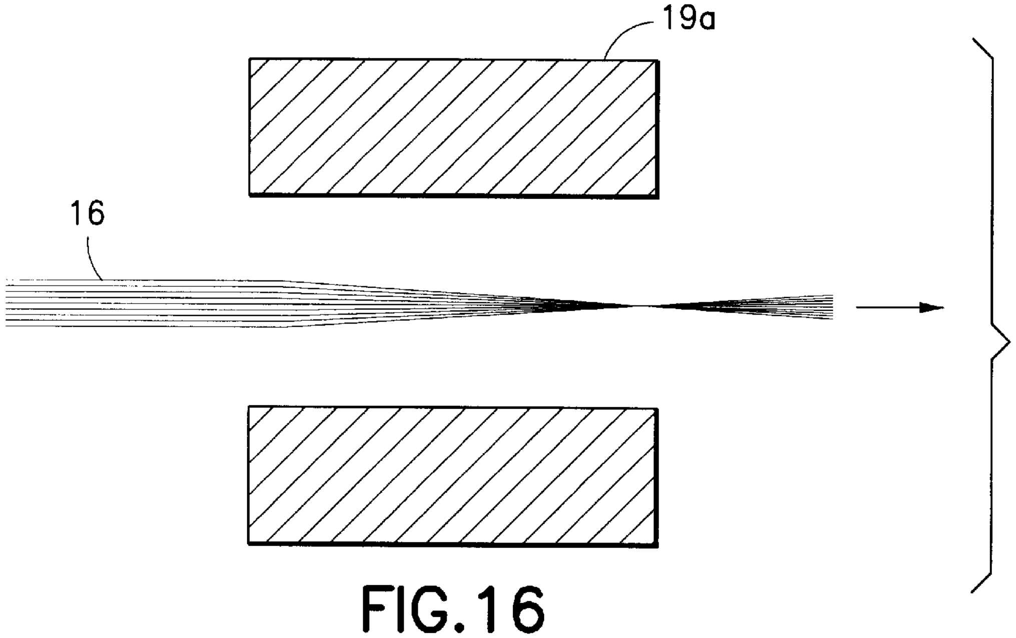
FIG. 16 is a side view that shows the cross-sectional shape of an ion beam in a prior art quadrupole lens.
Figure 17:
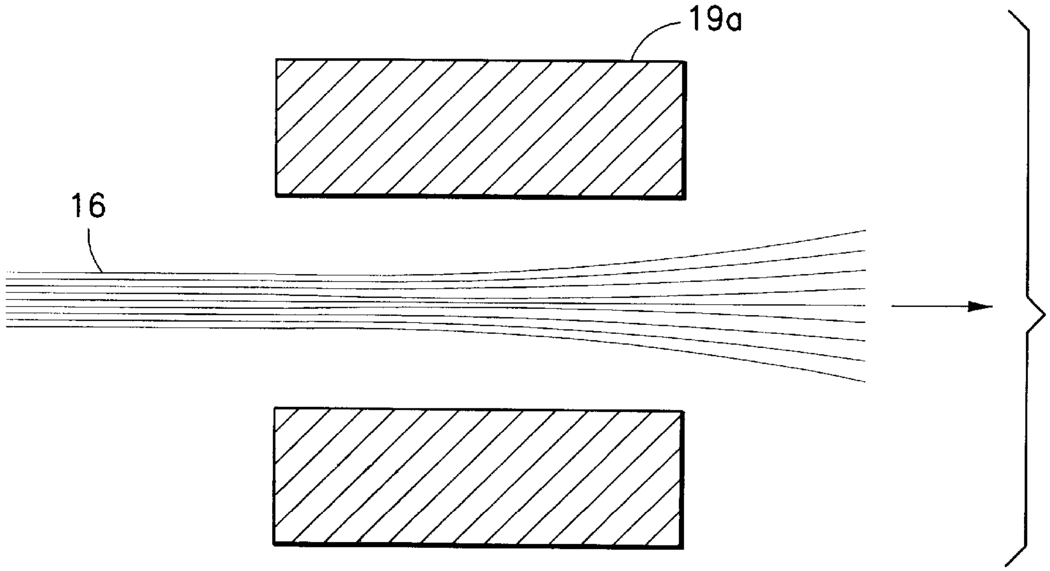
FIG. 17 is a top view of the same.
Figure 18:
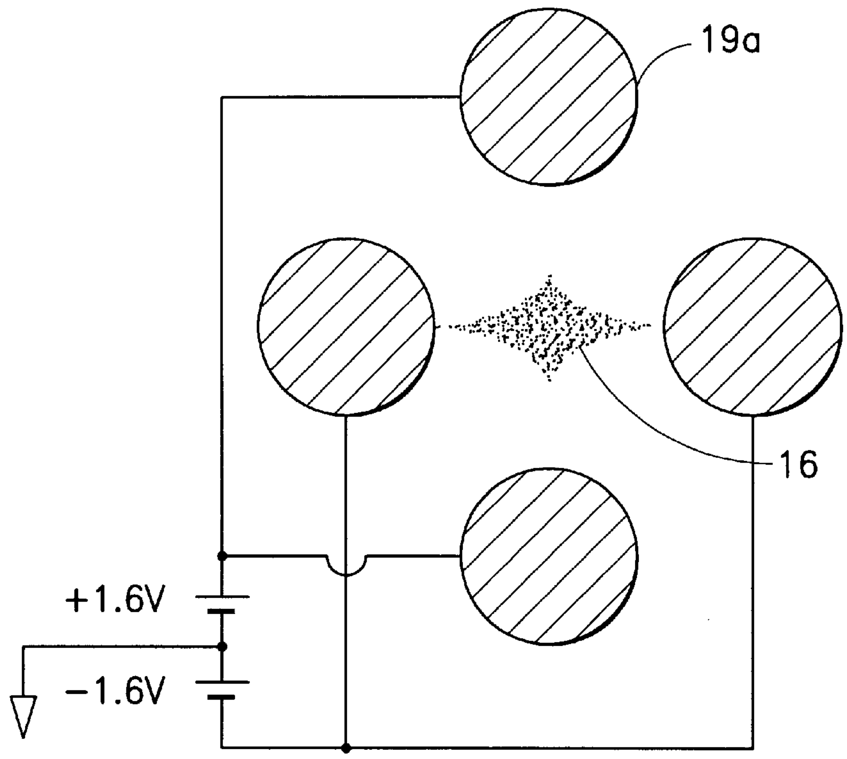
FIG. 18 is a cross-sectional view of the same.

FIG. 13 (side view), FIG. 14 (top view), and FIG. 15 (cross-sectional view) show a cross section of the ion beam when convergent lens 40 of this embodiment is used. This embodiment can produce a substantially a similar shape of the ion beam which is obtained by use of a conventional quadrupole as shown in FIG. 16 (side view), FIG. 17 (top view), and FIG. 18 (cross-sectional view). The operating voltage of prior art quadrupole lens 19 was $V_x=V_y=1.6V$ while 20V is obtained for convergent lens 40 of the present invention. Accordingly, the present invention can increase the operation voltage and thus a convergent rate may not vary due to instability by charge-up.

Figure 19:
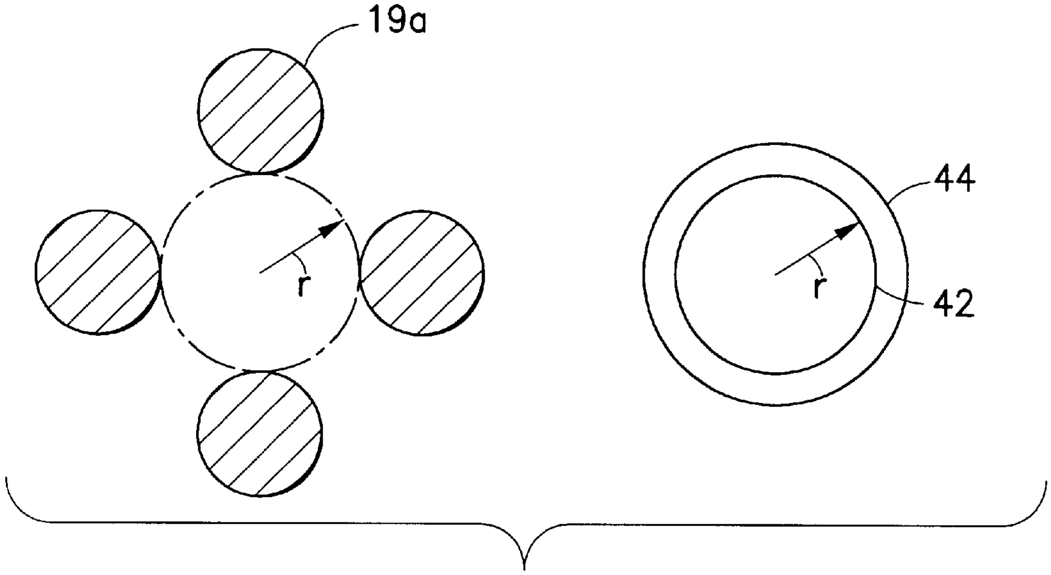
FIG. 19 is a cross-sectional view that compares the cross-sectional shapes of a prior art quadrupole lens and a convergent lens used for ion beams in the present invention.

As shown in the right portion of FIG. 19, a cross section of convergent lens 40 can be made relatively small in comparison with the quadrupole lens shown in the left side of FIG. 19. Since it is cylindrical, it can easily match the structure of typical cylindrical lenses.

Figure 20:
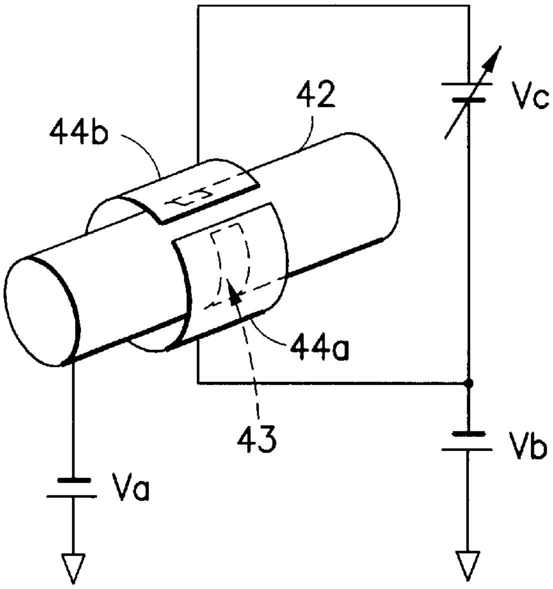
FIG. 20 is a perspective view that shows the construction of the second example of a convergent lens for ion beams in the present invention.
Figure 21:
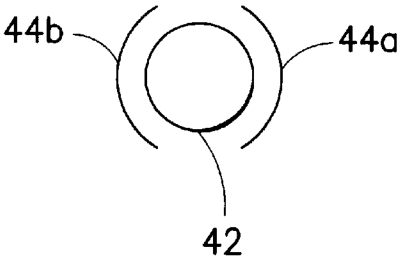
FIG. 21 is a cross-sectional view of the same.

Alternatively, a second example of the convergent lens as shown in FIG. 20 (perspective view) and FIG. 21 (cross-sectional view) divides outer electrode 44 into two outer electrodes 44*a*, 44*b*. In order to deflect the ion beam, a deflecting voltage Vc, e.g. 1/10 of outer electrode voltage Vb can be applied across outer electrodes 44*a* and 44*b*.

Figure 22:
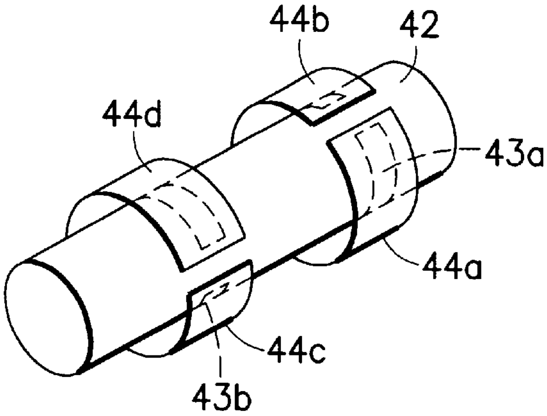
FIG. 22 is a perspective view that shows the construction of the third example of a convergent lens for ion beams in the present invention.

FIG. 22 illustrate a third example of convergent lens. In this example, side aperture 43*a* and 43*b* are disposed at two location along an axial direction of the inner electrode 42, which are for example placed by 90 degree of circumferential direction, and in relation to these apertures, outer electrodes 44*a*, 44*b*, 44*c*, 44*d* can be respectively placed so that bidirectional convergence and/or bidirectional deflection can be performed.

In accordance with the third example of convergent lens, a relatively high coaxiallity can be obtained and its total size can be more compact since it uses common inner electrodes with comparison to the bidirectional deflection or convergence obtained by two quadrapoles lenses are placed in series.

The first to third examples of convergent lenses above can be particularly effective for time-of-flight mass spectrometers, but it is also clear that they can similarly be used with other types of mass spectrometers and with analytical equipment in general. Also, the number of convergent lenses and the number of stages should not be limited to the embodiments explained in the description.

The cross-section shape of the inner electrode 42 and outer electrode(s) 44 should not be limited to a circular. It may be elliptical or other types of cross-sections.

For ion source 10, it is desirable to use an inductive coupling plasma, which has strong disassociating and separating power and therefore can break compounds into their atoms and ionize nearly 100% of those atoms. But, the types of ion sources that can be used for the present invention should not limited to this inductive coupling plasma.

The present invention can maintain a certain amount of ions that enter detector regardless of differences in the speeds of the ion beam in the direction of the continuous ion flow, thus it can reduce the mass dependency of the mass spectrometer and increase the robustness corresponding to changes in the characteristics of the ion source (e.g., as due to changes in the condition of the plasma).

When the ion lens has an aperture, which is long in the direction of continuous ion flow and short in the direction perpendicular to both the direction of continuous ion flow and the emission flow direction of a packet of ions are located in the flight tube, the converging action would prevent a dispersion of the beam in a direction orthogonal to both the above-mentioned directions, thus it can enhance the sensitivity.

The convergent lenses of the present invention can provide high operating voltage, so that it can prevent becoming instabilities due to changes in the rate of convergence in response to charge-up. Furthermore, these lenses can be made small compared to known quadrupole lenses, and they can thus easily fit with typical cylindrical lenses.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A time-of-flight mass spectrometer comprising:

an ion detector including an entrance aperture;

a pulser for providing an orthogonal acceleration to a continuous flow of a beam of ions so as to create packets of ions which flow in an orthogonal direction to said continuous flow of said beam of ions and enter said ion detector, said pulser including an ion emission aperture for transmitting said packets of ions and exhibiting a size greater than a size of the entrance aperture of the ion detector.

2. A time-of-flight mass spectrometer as described in claim 1 wherein the size of the ion emission aperture is at least twice as large as the size of the entrance aperture of the ion detector.

3. A time-of-flight mass spectrometer as described in claims 1 further comprising:

a flight tube positioned between said ion entrance aperture and said ion emission aperture, along which flow ion packets that have exited the ion emission aperture, and including an ion lens with an aperture that is long in a direction of the continuous flow of ions and short in a direction orthogonal to both the direction of said continuous flow of ions and the direction of the ion packets flow.

4. A time-of-flight mass spectrometer comprising:

an ion detector;

a pulser for providing an orthogonal acceleration to a continuous flow of a beam of ions so as to create packets of ions which flow in an orthogonal direction to said continuous flow of said beam of ions and enter said ion detector, said pulser including a flight tube coupled to said ion emission aperture, along which flow ion packets that have exited from the ion emission aperture, and including an ion lens with an aperture that is long in a direction of the continuous flow of ions and short in a direction orthogonal to both the direction of said continuous flow of ions and the direction of the ion packets flow.

5. A time-of-flight mass spectrometer as described in claim 4, wherein said pulser includes a convergent lens that has a tube-shaped inner electrode with at least one pair of apertures on its side surface and one or more tube-shaped outer electrodes that cover the apertures in a side surface of an inner electrode, for forming said continuous flow of said beam of ions.

6. A time-of-flight mass spectrometer as described in claim 5, wherein multiple pairs of apertures are provided on the side surface of the inner electrode along an axial direction of said inner electrode, with different circumferential angles for aperture positions, and at each aperture on the side surface in said axial direction is an outer electrode(s).

7. A time-of-flight mass spectrometer as described in claim 6 wherein the outer electrode(s) are partitioned into multiple pieces in a circumferential direction to enable deflection of the continuous ion flow.

8. A time-of-flight mass spectrometer as described in claim 1, wherein an inductive coupling plasma is used as an ion source that generates the continuous ion flow.

9. A time-of-flight mass spectrometer as described in claim 4, wherein an inductive coupling plasma is used as an ion source that generates the continuous ion flow.

10. A time-of-flight mass spectrometer as described in claim 5, wherein an inductive coupling plasma is used as an ion source that generates the continuous ion flow.

11. A time of flight mass spectrometer as described in claim 4, wherein said convergent lens has a tube-shaped inner electrode with at least one pair of apertures on its side surface, and at least one tube-shaped outer electrode that covers the apertures on the side surface of said inner electrode.

12. A time of flight mass spectrometer as described in claim 11, wherein said convergent lens includes multiple pairs of apertures that are present on a side surface of the inner electrode and that are provided along an axial direction of said inner electrode, with different circumferential angles for the aperture positions, and at each aperture on the side surfaces in said axial direction is an outer electrode(s).

13. A time of flight mass spectrometer as described in claim 12, wherein the outer electrode(s) are partitioned into multiple pieces in the circumferential direction to enable deflection of an ion beam.

* * * * *